US009921398B2

(12) United States Patent
Nakano et al.

(10) Patent No.: US 9,921,398 B2
(45) Date of Patent: Mar. 20, 2018

(54) DRIVE CONTROL METHOD FOR OBJECTIVE LENS AND FLUORESCENCE MICROSCOPE SYSTEM

(71) Applicant: RIKEN, Wako-shi, Saitama (JP)

(72) Inventors: Akihiko Nakano, Wako (JP); Akira Ichihara, Wako (JP)

(73) Assignee: RIKEN, Saitama (JP)

( * ) Notice: Subject to any disclaimer, the term of this patent is extended or adjusted under 35 U.S.C. 154(b) by 167 days.

(21) Appl. No.: 14/915,210

(22) PCT Filed: Aug. 25, 2014

(86) PCT No.: PCT/JP2014/004346
§ 371 (c)(1),
(2) Date: Apr. 14, 2016

(87) PCT Pub. No.: WO2015/029408
PCT Pub. Date: Mar. 5, 2015

(65) Prior Publication Data
US 2016/0252715 A1 Sep. 1, 2016

(30) Foreign Application Priority Data
Aug. 27, 2013 (JP) .................................. 2013-175477

(51) Int. Cl.
*G02B 21/00* (2006.01)
*G02B 21/16* (2006.01)
(Continued)

(52) U.S. Cl.
CPC ............. *G02B 21/16* (2013.01); *G02B 21/02* (2013.01); *G02B 21/08* (2013.01); *G02B 21/365* (2013.01);
(Continued)

(58) Field of Classification Search
CPC .. G02B 21/00; G02B 21/0009; G02B 21/002; G02B 21/0076; G02B 21/06; G02B 21/24; G02B 21/241; G02B 21/242
(Continued)

(56) References Cited

U.S. PATENT DOCUMENTS 5,233,197 A * 8/1993 Bowman ............ G01N 21/6458
250/461.1
7,232,980 B2 * 6/2007 Oshiro ................ G02B 21/245
250/201.3
(Continued)

FOREIGN PATENT DOCUMENTS

JP 04069069 A 3/1992
JP 08068756 A 3/1996
JP 11266883 A 10/1999

OTHER PUBLICATIONS

International Search Report (ISR) dated Nov. 25, 2014 issued in International Application No. PCT/JP2014/004346.
(Continued)

*Primary Examiner* — Arnel C Lavarias
(74) *Attorney, Agent, or Firm* — Holtz Holtz & Volek PC

(57) ABSTRACT

Provided is a driving control method of an objective lens in which an optical-axis chromatic aberration can be corrected by driving the objective lens, and an image can be quickly captured by realizing a quick driving and stabilizing of the objective lens so as to acquire a three-dimensional image at a high speed. A driving control method of the objective lens driven by a piezoelectric actuator provided in a fluorescence microscope includes a first step of applying a pulse voltage larger than a displacement voltage making the objective lens move to a focal position of an observation target to the piezoelectric actuator for a predetermined time so as to move the objective lens near the focal position, and a second step of applying the displacement voltage to the piezoelectric actuator after the first step to stabilize the objective lens.

4 Claims, 5 Drawing Sheets

(51) Int. Cl.
  *G02B 27/00* (2006.01)
  *G02B 21/36* (2006.01)
  *G02B 21/02* (2006.01)
  *G02B 21/08* (2006.01)

(52) U.S. Cl.
  CPC ..... *G02B 27/0025* (2013.01); *G02B 27/0068* (2013.01)

(58) Field of Classification Search
  USPC ....... 359/385, 362, 363, 368, 369, 379, 380, 359/382, 383, 388, 389, 390, 432
  See application file for complete search history.

(56) References Cited

U.S. PATENT DOCUMENTS

| 2002/0015225 A1* | 2/2002 | Ue | G02B 21/0088 359/383 |
| 2004/0013420 A1* | 1/2004 | Hara | G02B 7/08 396/55 |
| 2004/0264765 A1* | 12/2004 | Ohba | G02B 21/22 382/154 |

OTHER PUBLICATIONS

Japanese Office Action (and English translation thereof) dated Jan. 10, 2017 issued in Japanese counterpart Application No. 2013-175477.

* cited by examiner (A)

(B)

DRIVE CONTROL METHOD FOR OBJECTIVE LENS AND FLUORESCENCE MICROSCOPE SYSTEM

TECHNICAL FIELD

The present invention relates to a driving control method of an objective lens used in a fluorescence microscope and a fluorescence microscope system using the driving control method.

BACKGROUND ART

The fluorescence microscope is a microscope for observing a fluorescent light emitted from a sample of an observation target, and used in various fields such as biology and medicine.

In a case where the observation target is a protein in a cell, in order for the protein to be observed using the fluorescence microscope, the protein is marked by a fluorescent protein (hereinafter, referred to as "marker") such as Green Fluorescent Protein (GFP), Red Fluorescent Protein (RFP), or Blue Fluorescent Protein (BFP), which is added to the protein of target using a gene engineering method or an immunological method (for example, see Patent Literature 1).

Then, an excitation light is shed at a wavelength appropriate to the type of the fluorescent protein, and the fluorescent light emitted from the fluorescent protein is observed and imaged, so that the sample is observed through the fluorescent protein. As a light source of the excitation light, a laser light source (Ar, Ar—Kr, He—Ne, He—Cd, semiconductor lasers, etc.), an ultrahigh pressure mercury lamp, a xenon lamp, or an ultraviolet LED is used.

CITATION LIST

Patent Literature

Patent Literature 1: JP 11-266883 A

SUMMARY OF INVENTION

Technical Problem

When an interaction among the proteins in a living cell is observed using the fluorescence microscope, two or more proteins are marked by the fluorescent proteins that emits the fluorescent light at peak wavelengths different from each other. Then, the observation is performed by shedding the excitation light appropriate to each fluorescent protein, but at this time there is a problem that an optical-axis chromatic aberration is caused by an objective lens of the fluorescence microscope.

The optical-axis chromatic aberration is a phenomenon causing a deviation of the position of focal plane according to a color of the light, since a focal distance of a lens is different according to the wavelength of the light. Such a phenomenon causes mismatching of focal planes for different wavelengths (colors) and inconsistency of object images. In particular, in a three-dimensional spatial observation, a magnification in the optical axis of the microscope is in square characteristics, and thus the displacement of the image formed at a focus on the optical axis becomes 10,000 times larger in the case of a 100× objective lens. Therefore, the optical-axis chromatic aberration causes a significant problem.

In order to minimize the influence of the optical-axis chromatic aberration, a combination of tens of lenses having different refractive indexes is used as the objective lens in the related art. However, the optical-axis chromatic aberration is still left at the level of 150 to 200 nm even in such a scheme, thereby causing a significant influence when small proteins in a cell are observed.

For this reason, in a case where proteins in a cell are observed using the fluorescence microscope, there is required a novel method of correcting the optical-axis chromatic aberration different from the method using the conventional lens combination.

In addition, in a living cell, the object is always moving and thus the object blurring is easily caused. Therefore, there is a need to perform a high-speed image acquisition in order to prevent the object blurring.

Furthermore, multiple planar images need to be collected in a case where a three-dimensional image is acquired using the fluorescence microscope. In this case, the objective lens needs to be driven to the focal position required for each planar image, and the time taken for adjusting the focus need to be shortened in order to acquire the three-dimensional image at a high speed.

The invention has been made in view of the above-described problem, and an object thereof is to provide a driving control method of an objective lens and a fluorescence microscope system using the driving control method in which the optical-axis chromatic aberration can be corrected by driving the objective lens, and images can be quickly collected by realizing a high-speed driving and stabilizing of the objective lens so as to acquire the three-dimensional image at a high speed.

Solution to Problem

In order to solve the above-described problem, the inventor has invented a driving control method of an objective lens and a fluorescence microscope system using the driving control method in which the optical-axis chromatic aberration can be corrected by driving the objective lens, and images can be quickly collected by realizing a high-speed driving and stabilizing of the objective lens so as to acquire the three-dimensional image at a high speed.

According to a first aspect, there is provided a driving control method of an objective lens to correct an optical-axis chromatic aberration caused by the object lens that is provided in a fluorescence microscope and driven by a piezoelectric actuator, including: a first step of applying a pulse voltage to the piezoelectric actuator for a predetermined time so as to move the objective lens near a focal position of an observation target, the pulse voltage being larger than a displacement voltage needed to move the objective lens to the focal position; and a second step of applying the displacement voltage to the piezoelectric actuator after the first step to stabilize the objective lens.

According to a second aspect, in the method of correcting the optical-axis chromatic aberration according to the first aspect, a multiplied voltage of the displacement voltage is applied as the pulse voltage in the first step.

According to a third aspect, there is provided a fluorescence microscope system including: a light source; an objective lens that introduces a light beam emitted from the light source to an observation target; a piezoelectric actuator that drives the objective lens in an optical axis direction; and a driving unit that applies a pulse voltage to the piezoelectric actuator for a predetermined time to move the objective lens near a focal position of the observation target, the pulse voltage being larger than a displacement voltage needed to move the objective lens to the focal position, and then applies the displacement voltage to the piezoelectric actuator so as to stabilize the objective lens.

According to a fourth aspect, in the fluorescence microscope system according to the third aspect, the driving unit applies a multiplied voltage of the displacement voltage as the pulse voltage.

Advantageous Effects of Invention

According to the invention including the above-described configuration, an optical-axis chromatic aberration can be corrected by driving the objective lens, and images can be quickly collected by realizing a quick driving and stabilizing of the objective lens so as to acquire a three-dimensional image at a high speed.

DESCRIPTION OF EMBODIMENTS

Hereinafter, a fluorescence microscope system 1 as an embodiment of the invention and a method of correcting an optical-axis chromatic aberration performed therein will be described in detail.

Figure 1:
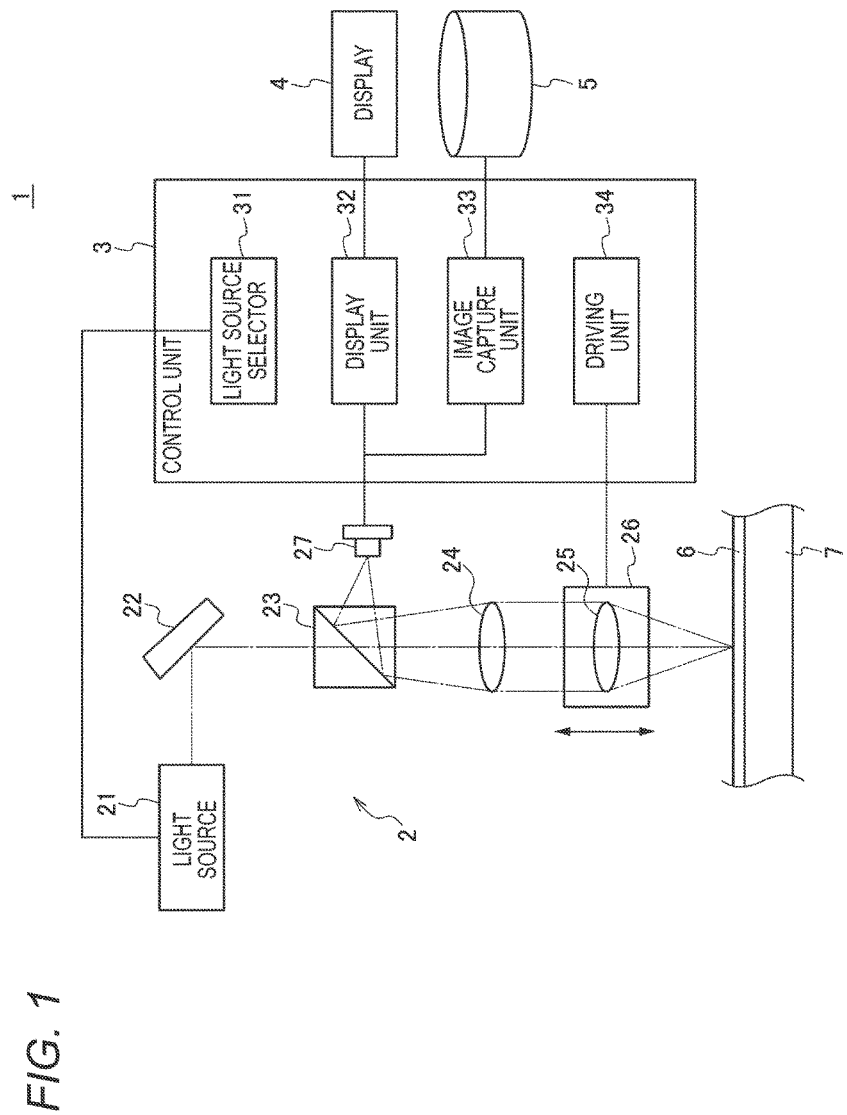
FIG. 1 is a block diagram illustrating a fluorescence microscope system according to an embodiment of the invention.

FIG. 1 is a block diagram illustrating the fluorescence microscope system 1 according to an embodiment of the invention. The fluorescence microscope system 1 is mainly configured by a fluorescence microscope 2 which performs observation on a fluorescent light emitted from an observation target 6, a display 4 which shows an image obtained by the fluorescence microscope 2, an external storage device 5 which stores the image obtained by the fluorescence microscope 2, and a control unit 3 which controls the fluorescence microscope 2, the display 4, and the external storage device 5.

The fluorescence microscope 2 is configured to include a light source 21 which emits an excitation light, a reflection mirror 22 which reflects the excitation light emitted from the light source 21 and changes an optical axis direction, a beam splitter 23 which selectively transmits the excitation light reflected on the reflection mirror 22, an imaging lens 24 and an objective lens 25 which are provided between the beam splitter 23 and the observation target 6 and refract the excitation light transmitting the beam splitter 23 and the fluorescent light emitted from the observation target 6, a piezoelectric actuator 26 which drives the objective lens 25 in the optical axis direction (a Z axis direction), a stage 7 on which the observation target 6 is placed, and an image capture device 27 which receives the fluorescent light emitted from the observation target 6.

The light source 21 is a light source which emits the excitation light (a laser light) having an excitation wavelength with respect to a fluorescence material marking an observation target. As the light source 21, one or more light sources such as an ultrahigh pressure mercury lamp, a xenon lamp, and an ultraviolet LED are used according to the type of the fluorescent light emitted from the observation target. The light source 21 is controlled in its operation by a light source selector 31 (described below) of the control unit 3.

The reflection mirror 22 is a mirror which reflects the excitation light emitted from the light source 21, changes the direction, and introduces the light to the beam splitter 23.

The beam splitter 23 has a filter property to divide the excitation light emitted from the light source 21 and the fluorescent light emitted from the observation target 6, and transmits almost 100% of the excitation light but reflects almost 100% of the fluorescent light. With such a property, the excitation light are shed onto the observation target 6 almost without power loss, and almost 100% of the fluorescent light emitted from the observation target 6 and passed through the objective lens 25 and the imaging lens 24 is sent to the image capture device 27.

The imaging lens 24 is a lens which introduces the excitation light passed through the beam splitter 23 as a parallel light into the objective lens 25, converts the fluorescent light passed through the objective lens 25 into a converged light, and forms an image at the image forming plane of the image capture device 27.

The objective lens 25 is a lens which converts the light beam passed through the imaging lens 24 into the converged light while focusing the converged light on the observation target 6, and converts the fluorescent light emitted from the sample into a parallel light and introduces the parallel light into the imaging lens 24.

The piezoelectric actuator 26 is an actuator using a piezoelectric effect that a piezoelectric element is deformed when a voltage is applied thereto, controlled in its operation by a driving unit 34 (described below) of the control unit 3, and drives the objective lens 25 in the optical axis direction.

Specifically, multiple piezoelectric elements are stacked in the Z axis direction in the piezoelectric actuator 26. Then, when the voltage is applied to the piezoelectric elements by the driving unit 34, the respective piezoelectric elements are deformed in the Z axis direction. The piezoelectric actuator 26 drives the objective lens 25 in the Z axis direction by a deformation force.

Further, the piezoelectric actuator 26 driving the objective lens 25 only in the Z direction is used in this embodiment, but the invention is not limited thereto. The piezoelectric actuator 26 may further drive the objective lens 25 in an X direction and a Y direction.

The stage 7 is a stage on which the observation target 6 is placed, and is moved in an X-Y direction by an actuator (not illustrated). Further, the stage 7 of the invention is not limited to the above configuration, but may be further moved in the Z direction. The actuator used for the movement of the stage 7 is not particularly limited, and may be a stepping motor or an air cylinder besides the piezoelectric actuator. In addition, the stage 7 may be manually moved.

The image capture device 27 is a camera using a solid-state image capture element such as a Charge Coupled Device (CCD) which receives the fluorescent light emitted from the observation target 6 and passed through the objective lens 25, the imaging lens 24, and the beam splitter 23 so as to form an image. In a case where the image capture device 27 is the CCD, an object image passed through the imaging lens 24 and the objective lens 25 is formed on an imaging plane, an image signal is generated through a photoelectric conversion, and the image signal is transmitted to a display unit 32 and an image capture unit 33 (described below) of the control unit 3.

Further, it is assumed in this embodiment that the image capture device 27 captures a still image, but the invention is not limited thereto. A moving image may be also captured. The image capture device 27 is controlled in its driving by the image capture unit 33 of the control unit 3.

The display 4 is a screen on which an image of the observation target 6 obtained by the image capture device 27 of the fluorescence microscope 2 is displayed, and is controlled by the display unit 32 of the control unit 3. The display 4 may be a simple image displaying unit, or may be a touch panel to allow a user to set the entire fluorescence microscope system 1 through the control unit 3.

The external storage device 5 stores various types of data containing the image of the observation target 6 obtained by the fluorescence microscope 2.

The control unit 3 controls the entire fluorescence microscope system 1, and is configured by a personal computer or the like. The control unit 3 is configured to include a Central Processing Unit (CPU) which controls the entire control unit 3, a Read Only Memory (ROM) which stores a control program executed on the CPU, and a Random Access Memory (RAM) which is used to temporarily store various types of data. Further, the CPU, the ROM, and the RAM are omitted from the drawing.

When the CPU develops the control program stored in the ROM into the RAM and executes the program, the control unit 3 functions as the light source selector 31, the display unit 32, the image capture unit 33, and the driving unit 34.

The light source 21 to be used in accordance with the type of the fluorescent light to be emitted by the observation target 6 is selected by the light source selector 31 according to the observation target so that the wavelength of the light to be emitted from the light source 21 is changed.

The display unit 32 displays the image captured by the image capture device 27 in the display 4 which is externally connected to the control unit 3.

The image capture unit 33 controls the driving of a shutter and a image capture timing of the image capture device 27, and stores the data of the image captured by the image capture device 27 in the external storage device 5 connected to the control unit 3.

The driving unit 34 controls the driving of the piezoelectric actuator 26 by controlling a magnitude and a timing of a voltage applied to the piezoelectric actuator 26. The control of the piezoelectric actuator 26 performed by the driving unit 34 is based on a focal distance according to each fluorescent color previously determined for each type of marker. The information on the type of marker, the focal distance, and a necessary applying voltage is stored in the RAM or the external storage device 5, and read out by the driving unit 34 at the time when the piezoelectric actuator 26 is driven, so that the voltage to be applied to the piezoelectric actuator 26 is determined.

Next, an operation of introducing the excitation light and the fluorescent light by the fluorescence microscope system 1 will be described.

First, the light source 21 emitting the excitation light having a wavelength corresponding to the observation target 6 is selected by the light source selector 31, and the excitation light is emitted from the selected light source 21 toward the reflection mirror 22. Further, the information of the selected light source 21 is sent from the light source selector 31 to the driving unit 34, and used by the driving unit 34 to select a voltage to be applied to the piezoelectric actuator 26.

Next, the excitation light reaching at the reflection mirror 22 is reflected on the reflection mirror 22 and changed in its advancing direction, and then introduced to the beam splitter 23. The beam splitter 23 transmits almost (nearly 100%) the excitation light as described above. Therefore, almost (nearly 100%) the excitation light introduced to the beam splitter 23 transmits the beam splitter 23, and is introduced to the imaging lens 24.

The excitation light introduced to the imaging lens 24 is transmitted as a parallel light through the imaging lens 24, and introduced to the objective lens 25. Herein, in a case where the excitation light emitted out of the light source 21 is the parallel light, the excitation light transmits the imaging lens 24 as the parallel ray. On the other hand, in a case where the excitation light is a diffused light, the diffused light is converted into the parallel light by the imaging lens 24.

Next, the excitation light introduced from the imaging lens 24 to the objective lens 25 is converted into the converged light by the objective lens 25, and shed to the observation target 6 while focusing thereon.

The focusing is performed by determining the voltage applied to the piezoelectric actuator 26 by the driving unit 34 based on the information on the light source 21 sent from the light source selector 31. When the voltage applied to the piezoelectric actuator 26 varies, a moving distance of the piezoelectric actuator 26 varies, and a stabilized position of the objective lens 25 driven by the piezoelectric actuator 26 also varies. Therefore, a focal position of the excitation light can be adjusted by changing the stabilized position of the objective lens 25.

Next, the excitation light passed through the objective lens 25 is shed to the observation target 6 on the stage 7. The fluorescent light having a wavelength corresponding to the type of the marker of the observation target 6 is emitted as a scattered light due to the excitation by the excitation light.

The diffused fluorescent light emitted from the marker is converted into a parallel light by the objective lens 25, and introduced to the imaging lens 24. Further, the objective lens 25 may convert the fluorescent light into the converged light.

Next, the fluorescent light passed through the objective lens 25 is introduced to the imaging lens 24. The fluorescent light is converted into the converged light by the imaging lens 24 to form an image at the imaging plane of the image capture device 27, and introduced to the beam splitter 23.

The beam splitter 23 reflects almost (nearly 100%) the fluorescent light as described above, and introduces the fluorescent light to the image capture device 27. Then, a fluorescent image is formed at the imaging plane of the image capture device 27 and the imaging is performed.

When a protein in a living cell is observed by the fluorescence microscope, the intracellular protein moves in the cell at a high speed, thereby causing an object blurring at the time of imaging. For this reason, the objective lens 25 is moved at an ultrahigh speed by the piezoelectric actuator 26 through the above method so as to be focused on the object, and the shutter is driven at a speed higher than the moving speed of the intracellular protein, so that the object blurring at the time of imaging is minimized.

Figure 2:
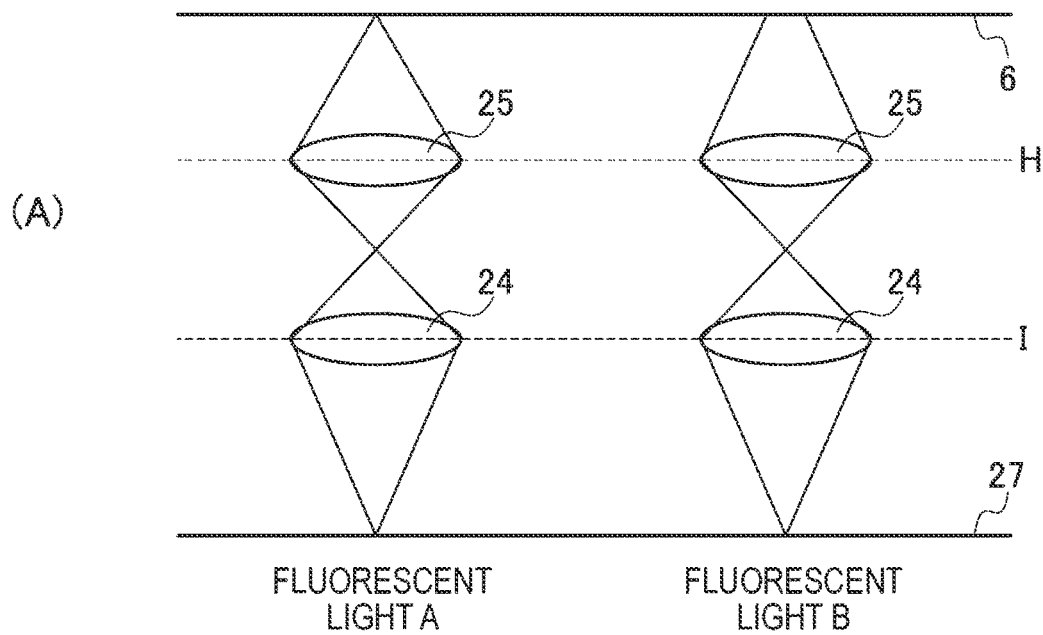
FIGS. 2(A) and 2(B) illustrate states in which a correction of an optical-axis chromatic aberration is performed, in which 2(A) is a diagram illustrating a position of an objective lens 25 before the correction of the optical-axis chromatic aberration, and 2(B) is a diagram illustrating a position of the objective lens 25 after the correction of the optical-axis chromatic aberration.
Figure 2:
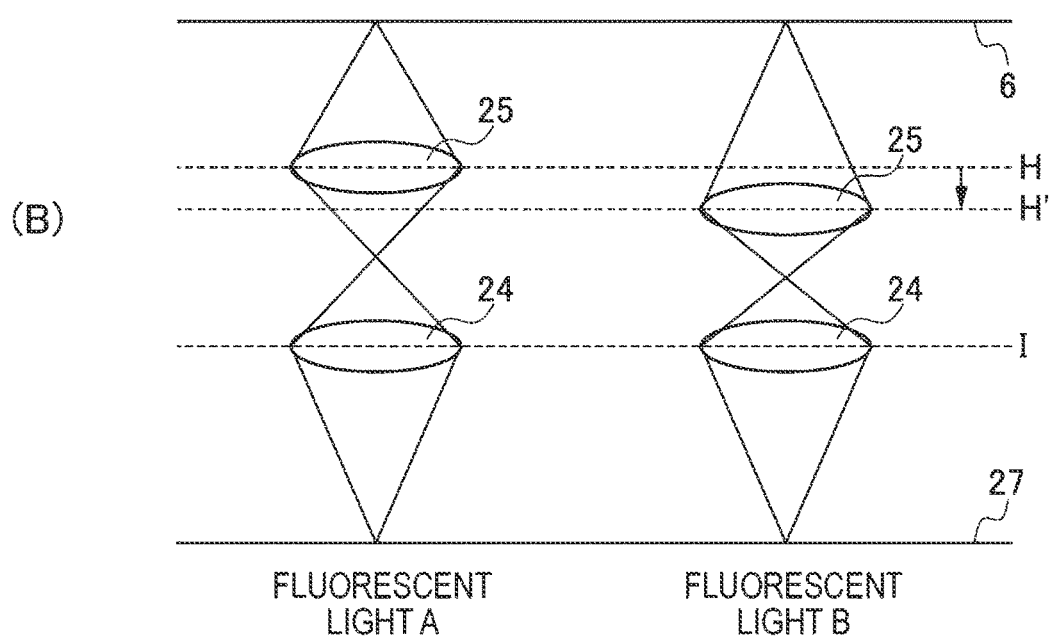
Figure 3:
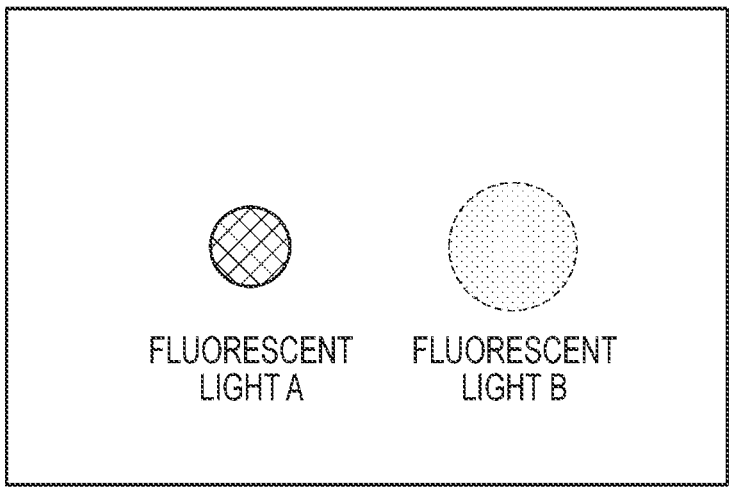
FIGS. 3(A) and 3(B) illustrate states of images before and after the correction of the optical-axis chromatic aberration, in which 3(A) is a diagram illustrating a projected image before the correction of the optical-axis chromatic aberration, and 3(B) is a diagram illustrating a projected image after the correction of the optical-axis chromatic aberration.
Figure 3:
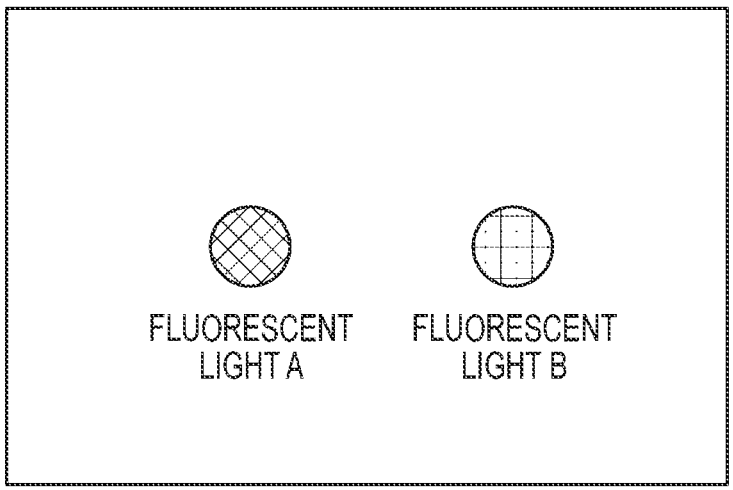

The description will be made about the minimization of the object blurring through the movement of the objective lens 25. FIG. 2 illustrates a state of the correction of the optical-axis chromatic aberration, in which (A) illustrates a position of the objective lens 25 before the correction of the optical-axis chromatic aberration, and (B) illustrates a position of the objective lens 25 after the correction of the optical-axis chromatic aberration. FIG. 3 illustrates a state of images immediately after the correction of the optical-axis chromatic aberration, in which (A) is a diagram illustrating an image captured before the correction of the optical-axis chromatic aberration, and (B) is a diagram illustrating an image after the correction of the optical-axis chromatic aberration.

As described above, the optical-axis chromatic aberration caused by the focal distance of the lens varying according to the wavelength of the fluorescent light raises a problem in the fluorescence microscope.

For example, FIG. 2(A) shows a state that the focal distances of the fluorescent light A and the fluorescent light B are different. The fluorescent light A is in focus at the observation target 6 when the imaging lens 24 is at a position I and the objective lens 25 is at a position H. However, unlike the case of the fluorescent light A, the fluorescent light B is out of focus at the observation target 6 despite that the imaging lens 24 is at the position I and the objective lens 25 is at the position H.

In a case where the imaging is performed in the state of FIG. 2(A), the captured image appears as illustrated in FIG. 3(A). Since the fluorescent light A is in focus, the sample of the observation target is clearly reflected. On the other hand, since the fluorescent light B is out of focus, the sample of the observation target is dimly reflected. Such a focus deviation phenomenon for each fluorescent light is the optical-axis chromatic aberration.

Therefore, in the fluorescence microscope system 1 according to this embodiment, the objective lens 25 is moved in the Z direction (the optical axis direction) by the piezoelectric actuator 26 for each wavelength of the fluorescent light emitted from the sample of the observation target, so that the optical-axis chromatic aberration is corrected.

FIG. 2(B) illustrates a state in which the optical-axis chromatic aberration is corrected by moving the objective lens 25 from the position H to the position H' for the fluorescent light B deviated in focus due to the optical-axis chromatic aberration in FIG. 2(A). When the image of the observation target is captured in such a state after the correction of the optical-axis chromatic aberration, the obtained image appears as illustrated in FIG. 3(B). In FIG. 3(B), since the fluorescent light B also comes to be in focus, the sample of the observation target is clearly reflected.

When the objective lens 25 is moved at an ultrahigh speed to pick up an image, the objective lens 25 is required to be quickly stopped at a desired position. However, in practice, the objective lens 25 vibrates minutely in a little while (hereinafter, referred to as "transient response") and cannot be immediately stopped even after the actuator is stopped.

When the shutter is opened at the time of such a transient response of the objective lens 25, there is caused a camera blurring.

Therefore, the shutter should be opened at the state where the transient response is converged within a range ready for the imaging, specifically a state where the transient response falls into a distance within 10% of the distance between the focal position and the driving start position of the objective lens 25 (hereinafter, this state is referred to as "stabilization"). At the state where the objective lens 25 is stabilized, the influence of the camera blurring on the image is extremely low if any. Therefore, it may be considered that the objective lens 25 is stopped.

However, in a driving control method of the piezoelectric actuator 26 which is conventionally performed (that is, a method of continuously applying a constant voltage causing a desired potential to the piezoelectric actuator 26 until the objective lens 25 is stabilized after the driving start), a time taken for the stabilization of the objective lens 25 after the driving start (hereinafter, referred to as "stabilization time") cannot be shortened.

Therefore, it is made possible to shorten the stabilization time in the fluorescence microscope system 1 according to the invention by changing the voltage applied to the piezoelectric actuator 26 in the middle of displacing the piezoelectric actuator 26 in the fluorescence microscope 2 in which the objective lens 25 is moved at an ultrahigh speed to correct the optical-axis chromatic aberration. Hereinafter, a method of shortening the stabilization time will be specifically described.

Figure 4:
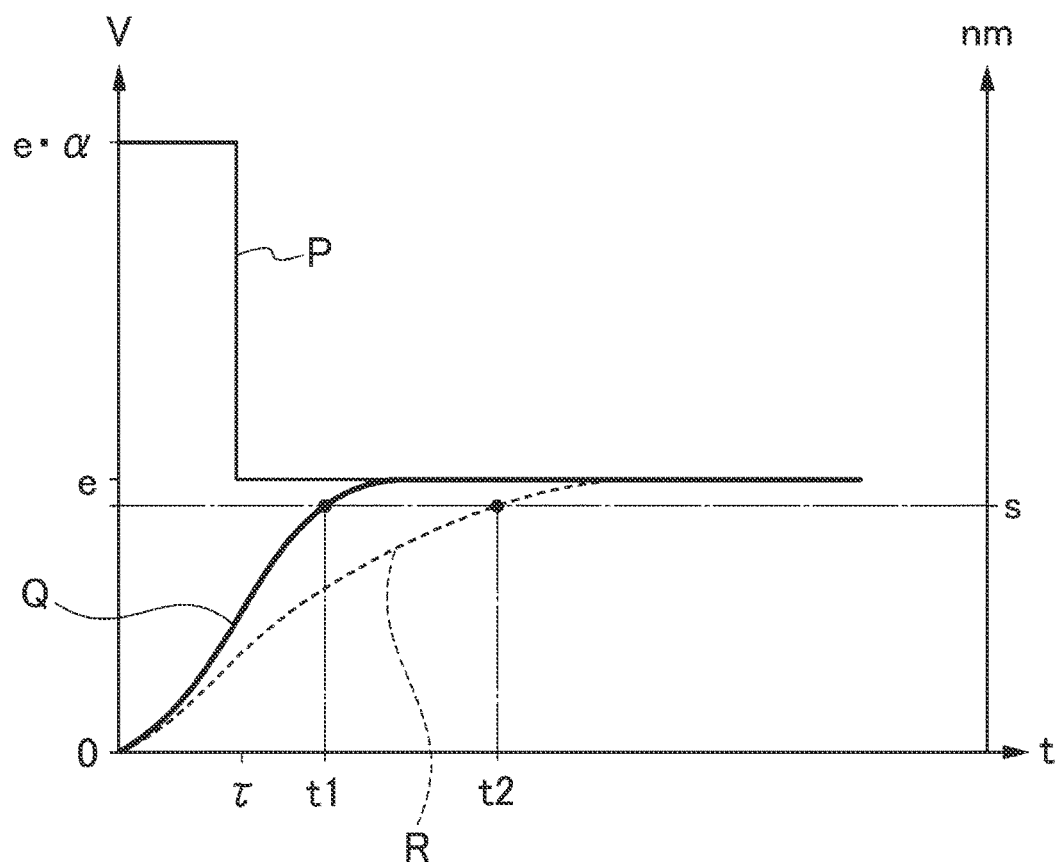
FIG. 4 is a graph illustrating a state in which a voltage is adjusted in order to shorten a stabilization time of the objective lens.

FIG. 4 is a graph illustrating a state where an applying voltage is adjusted to shorten the stabilization time of the objective lens 25. In FIG. 4, the dotted line R indicates a voltage application scheme in a conventional driving method of the piezoelectric actuator 26, the solid line Q indicates a voltage application scheme in the driving method of the piezoelectric actuator 26 in this embodiment, and the solid line P indicates a voltage applied to the piezoelectric actuator 26 in this embodiment. In FIG. 4, the horizontal axis represents a time, the vertical axis on the left side represents a voltage, and the vertical axis on the right side represents a displacement distance (nm) of the piezoelectric actuator.

In the conventional driving scheme of the piezoelectric actuator 26, a constant displacement voltage e is applied until the objective lens 25 is stabilized after the driving start. The displacement voltage e is a voltage generating a displacement causing the objective lens 25 in the piezoelectric actuator 26 to move to the focal position of the observation target.

On the other hand, in this embodiment, as depicted by the solid line P, first a rectangular pulse voltage having an amplitude of a multiplication of the displacement voltage e (that is, e·α (α is an integer of 2 or more)) is applied to the piezoelectric actuator 26 for a time τ. At this time, the application time τ of the pulse voltage is shorter than time t2 which is time duration required to drive the objective lens 25 to the stabilized position S in the conventional driving method, and the objective lens 25 is moved near the focal position by applying the pulse voltage.

Then, after the time τ, the objective lens 25 is moved up to a desired focal position by applying the displacement voltage e to the piezoelectric actuator 26.

In this way, in this embodiment, the objective lens 25 is first moved near the focal position at a high speed by applying the large pulse voltage to the piezoelectric actuator 26. Then, the objective lens 25 is moved up to the focal position at a low speed and stabilized by changing the voltage into the small displacement voltage on the way of moving so as to change the piezoelectric actuator 26 at a low speed.

Therefore, the piezoelectric actuator 26 can be stabilized in the stabilization time t1 shorter than the stabilization time t2 in the conventional driving method. In addition, since the pulse voltage is set to a multiplied voltage of the displacement voltage e, the piezoelectric actuator 26 can be easily controlled.

Figure 5:
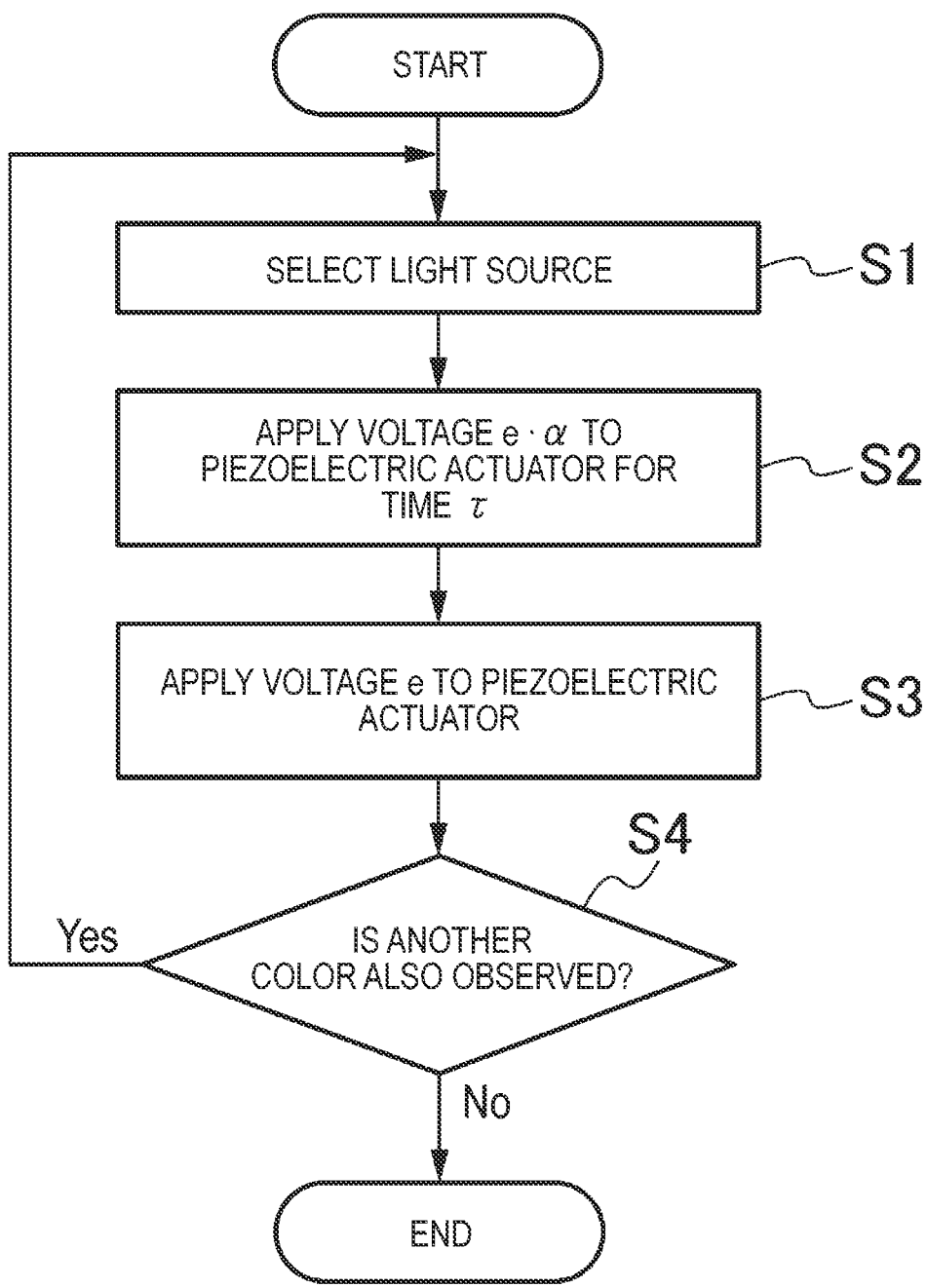
FIG. 5 is a flowchart illustrating a method of correcting the optical-axis chromatic aberration according to an embodiment of the invention.

Next, the each step of the method of correcting the optical-axis chromatic aberration in the fluorescence microscope system 1 will be specifically described using a flowchart. FIG. 5 is a flowchart illustrating a method of correcting the optical-axis chromatic aberration according to the embodiment of the invention.

First, in the method of correcting the optical-axis chromatic aberration according to this embodiment, the light source selector 31 of the control unit 3 selects the light source which emits the light having a wavelength corresponding to the sample of the observation target (Step S1).

Next, the driving unit 34 applies the pulse voltage e·α to the piezoelectric actuator for the time τ (Step S2). As described above, α is an integer of 2 or more, and specific values of parameters e and α are appropriately selected according to the respective light sources. The piezoelectric actuator 26 is displaced at a high speed by applying the pulse voltage which is high voltage in Step S2, and the objective lens 25 is moved at a high speed.

Next, the driving unit 34 applies the displacement voltage e to the piezoelectric actuator 26 (Step S3). At the time, the applied voltage e has a 1/α amplitude of the voltage e·α applied in Step S2. The piezoelectric actuator 26 is displaced at a low speed by applying the displacement voltage e, and thus the objective lens 25 is moved at a low speed and stabilized.

In this way, since the displacement voltage significantly smaller than the pulse voltage applied in Step S2 is applied in Step S3, as sort of a harsh braking is applied to the driving piezoelectric actuator 26.

The piezoelectric actuator 26 is driven at a high speed by the high voltage of Step S2 so as to quickly move the objective lens 25 near the focal position, and then the piezoelectric actuator 26 is driven at a low speed by the low voltage of Step S3 so as to stabilize the objective lens 25.

Through such a driving control of the piezoelectric actuator 26, it is possible to stabilize the objective lens 25 in a short time.

In a case when making observation of another color of fluorescent light emitted from another marker after the objective lens 25 is stabilized (Step S4: Yes), the procedure returns to Step S1, the light source selector 31 selects the light source emitting the light having a wavelength corresponding to the sample of the observation target again, and a series of subsequent processes are repeatedly performed.

On the other hand, in a case where the other color of fluorescent light is not observed, that is, all the samples are observed (Step S4: No), all the series of operations are ended.

According to the method of correcting the optical-axis chromatic aberration in this embodiment, the optical-axis chromatic aberration of the objective lens 25 can be corrected by driving the objective lens 25 in the optical axis direction, and the stabilization time at the time of driving can be shortened. Therefore, it is possible to quickly capture the image of the observation target while effectively preventing the object blurring and the camera blurring. The method of correcting the optical-axis chromatic aberration is specifically useful when capturing a three-dimensional image of the observation target.

The three-dimensional image is obtained by capturing multiple X-Y planer images different in position along the Z axis while moving the objective lens 25 with respect to the fluorescent object sample having at least a Voxel size of the fluorescence microscope system 1, performing a convolutional integration process on the planar image group, and further performing an inverse convolutional integration.

In a case where the object is a material in a living cell, the object is always moving when the three-dimensional image is acquired, and thus the object blurring is easily caused. In order to prevent such an object blurring, it is necessary to quickly drive and stabilize the objective lens 25 for capturing an image in a short time.

In addition, multiple planar images are necessary for acquiring a three-dimensional image, and the objective lens 25 is necessarily driven and stabilized at the acquisition position of the planar image for each fluorescent light. Therefore, it is essential that the stabilization time of the objective lens 25 be shortened in order to quickly acquire the three-dimensional image.

Using the method of correcting the optical-axis chromatic aberration according to the invention, the three-dimensional image can be quickly obtained while effectively preventing the object blurring and the camera blurring even when the three-dimensional image is acquired.

Further, the multiplied voltage of the displacement voltage is applied as the pulse voltage in the above-described embodiment, but the invention is not limited thereto. The same operational advantage can be obtained as long as the pulse voltage is larger than the displacement voltage.

REFERENCE SIGNS LIST 1 fluorescence microscope system
2 fluorescence microscope
3 control unit
4 display
5 external storage device
6 observation target
7 stage
21 light source
22 reflection mirror
23 beam splitter
24 imaging lens
25 objective lens
26 piezoelectric actuator
27 image capture device
31 light source selector
32 display unit
33 image capture unit
34 driving unit

The invention claimed is:

1. A driving control method of an objective lens, provided in a fluorescence microscope, to correct an optical-axis chromatic aberration caused by the objective lens which is driven by a piezoelectric actuator, the method comprising:
a first step of applying a pulse voltage to the piezoelectric actuator for a predetermined time so as to move the objective lens near a focal position of an observation target, the pulse voltage being larger than a displacement voltage needed to move the objective lens to the focal position; and a second step of applying the displacement voltage to the piezoelectric actuator after the first step to stabilize the objective lens.

2. The driving control method of the objective lens according to claim 1, wherein a multiplied voltage of the displacement voltage is applied as the pulse voltage in the first step.

3. A fluorescence microscope system comprising:
a light source;
an objective lens that introduces a light beam emitted from the light source to an observation target;
a piezoelectric actuator that drives the objective lens in an optical axis direction; and
a driving unit that first applies a pulse voltage to the piezoelectric actuator for a predetermined time to move the objective lens near a focal position of the observation target, the pulse voltage being larger than a displacement voltage needed to move the objective lens to the focal position, and then applies the displacement voltage to the piezoelectric actuator so as to stabilize the objective lens.

4. The fluorescence microscope system according to claim 3, wherein the driving unit applies a multiplied voltage of the displacement voltage as the pulse voltage.

* * * * *